W. V. TURNER.
EMERGENCY VALVE DEVICE.
APPLICATION FILED MAY 6, 1913.
1,145,045.
Patented July 6, 1915.
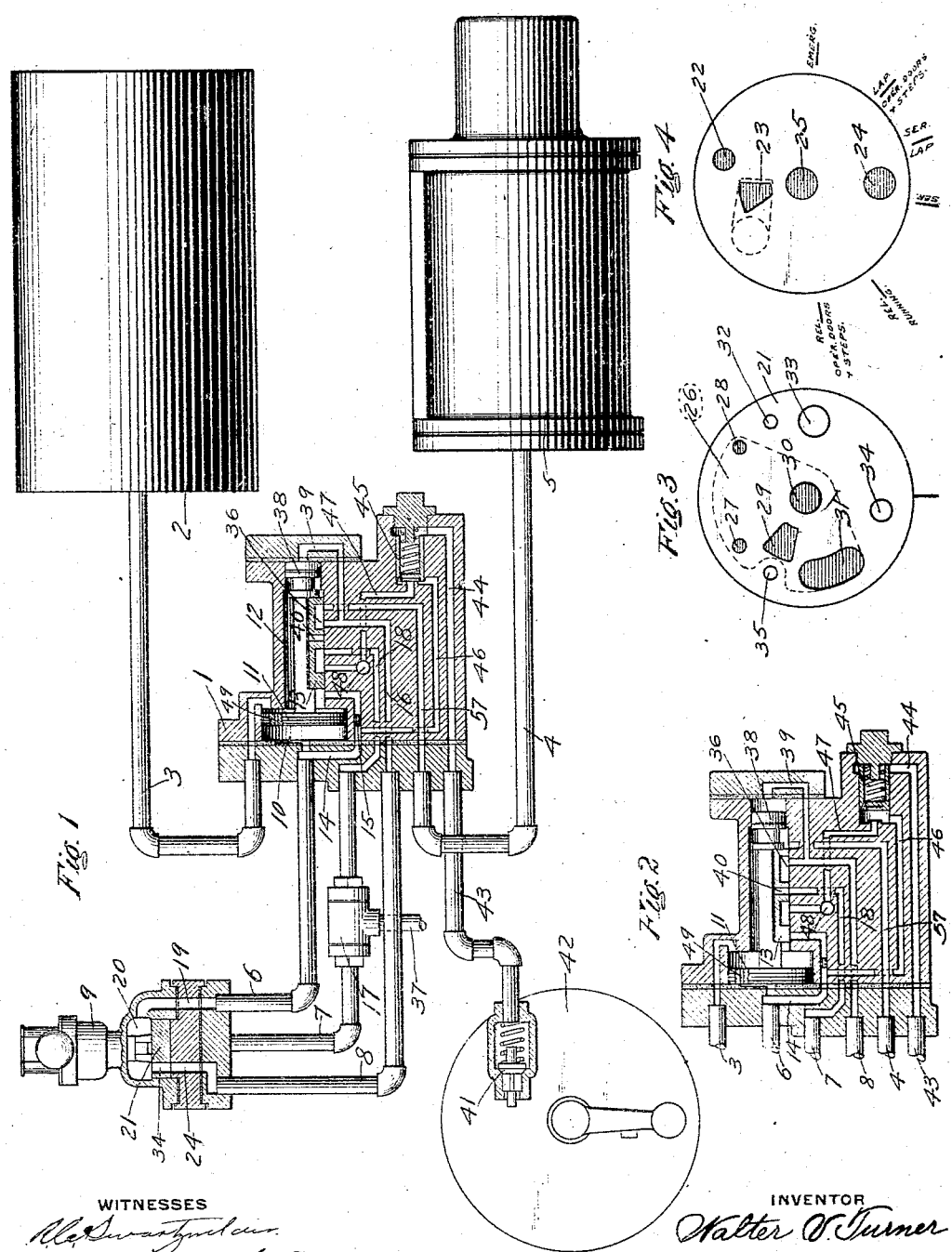

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

EMERGENCY-VALVE DEVICE.

1,145,045.

Specification of Letters Patent.

Patented July 6, 1915.

Application filed May 6, 1913. Serial No. 765,772.

*To all whom it may concern:*

Be it known that I, WALTER V. TURNER, a citizen of the United States, residing at Edgewood, in the county of Allegheny and State of Pennsylvania, have invented new and useful Improvements in Emergency-Valve Devices, of which the following is a specification.

This invention relates to fluid pressure brakes, and more particularly to an apparatus for controlling both the brakes and the doors and steps of cars by means of fluid under pressure.

The principal object of my invention is to provide improved means for controlling the car brakes and the doors and steps.

In the accompanying drawing, Figure 1 is a diagrammatic view of a car air brake equipment embodying my invention, and showing the emergency valve device in normal release position; Fig. 2 a central sectional view of the emergency valve device, showing the parts in emergency application position; Fig. 3 a face view of the rotary valve of the motorman's brake valve; and Fig. 4 a plan view of the seat for said rotary valve.

The apparatus on the car may comprise an emergency valve device 1, connected by a pipe 3 to a supply reservoir 2, by pipe 4 to brake cylinder 5; and by pipes 6, 7, and 8 to a motorman's brake valve 9.

The emergency valve device 1 has the usual piston chamber 10 containing piston 11 and valve chamber 12 containing slide valve 13. The piston chamber 10 is connected to the automatic emergency and brake valve supply pipe 6 and the valve chamber 12 is connected by pipe 3 to reservoir 2. A passage 14, containing a choke plug 15, leads from the seat of slide valve 13 and communicates with the emergency pipe 6. The straight air pipe 8 connects with passage 16 leading to the seat of the slide valve 13. Pipe 7 contains a double check valve 17 for controlling communication to the car doors and steps and connects with a passage 18 also leading to the seat of slide valve 13. Pipe 6 connects with passage 19 in the brake valve 9 leading to the valve chamber 20 above the rotary valve 21. Referring to the plan view of the rotary valve seat, as shown in Fig. 4 of the drawing, the port 22 therein connects with door and step controlling pipe 7, port 23 is connected to emergency passage 19, port 24 to straight air pipe 8 and port 25 is an atmospheric exhaust port.

The rotary valve 21 is provided with a cavity 26, shown in dotted lines, having openings 27, 28, 29, 30, and 31, the opening 30 being adapted to constantly register with exhaust port 25 in the valve seat. The rotary valve 21 is also provided with through ports 32, 33, 34, and 35.

In operation, fluid under pressure is supplied from reservoir 2 through pipe 3 to valve chamber 12 and thence flows through passage 14 and the choke plug 15 to piston chamber 10 and through emergency pipe 6 to the rotary valve chamber 20.

A straight air application of the brakes is made by turning the brake valve handle to service position, in which the through port 34 in the rotary valve registers with straight air port 24. Fluid under pressure is then supplied from the rotary valve chamber 20 through pipe 8, passage 16, cavity 36 in emergency slide valve 13, and passage 57 to brake cylinder pipe 4. The supply of fluid in the rotary valve chamber 20 is maintained by flow from reservoir 2 and valve chamber 12 through passage 14 and emergency pipe 6.

If, while the brakes are thus applied, it is desired to hold the car doors and steps in closed position, the brake valve handle is turned to service lap position, in which the port 27 in the rotary valve registers with port 22 in the seat. Pipe 7 is thus connected to the exhaust and the door and step operating mechanism being arranged to close by exhaust of air and open by supplying air, the doors and the steps are therefore closed.

If the doors and steps are to be opened, then the motorman moves the brake valve handle to the second lap position, in which the door and step port 22 is connected to through port 35 in the rotary valve, so that fluid under pressure is supplied to pipe 7 and acting on the double check valve 17, shifts the same so as to open the brake valve side of pipe 7 to pipe 37 which leads to the door and step operating mechanism.

The brakes are released after a straight air application by turning the brake valve handle to release position, in which the straight air port 24 is connected to the exhaust port 25 through port openings 31 and 30 of the cavity 26 in the rotary valve, so that fluid is released from the brake cylinder through the straight air pipe. If the doors and steps are to be closed in releasing the brakes, the brake valve handle is merely left in the running and release position, the port opening 28 in the rotary valve connecting the port 22 with the exhaust. If the doors and steps are to be opened, the brake valve handle is turned to the release door operating position, in which the through port 32 registers with port 22, so that fluid is supplied to the door and step operating mechanism for shifting the doors and steps to open position.

In order to make an emergency application of the brakes, the brake valve handle is turned to emergency position, in which the opening 29 of the exhaust cavity 26 registers with emergency train pipe port 23. Fluid is then vented from the piston chamber 10 more rapidly than fluid can flow through the restricted port in choke plug 15.

The emergency valve device may be provided with a differential piston head 38 and in release position, the outer face of this piston head is subject to atmospheric pressure, being connected by passage 39 with the straight air passage 16. Consequently in making an emergency application of the brakes, the pressure in piston chamber 10 is reduced to a point sufficient to overcome the differential in pressures due to the small piston head 38 being subject to atmospheric pressure, then the piston 11 is operated to shift the slide valve 13 to the position shown in Fig. 2 of the drawing. In this position, the passage 57 is uncovered by the movement of slide valve 13, so that fluid under pressure is supplied from valve chamber 12 and reservoir 2 to the brake cylinder. A through port 40 in slide valve 13 also registers with passage 18, so that fluid is supplied to pipe 7. The double check valve 17 is thereupon shifted so as to open communication through pipe 7 from the emergency valve side of the double check valve to the door and step control pipe 37. The admission of fluid to pipe 37 operates the door and step mechanism so as to automatically throw the doors and steps to open position.

In the emergency position of the brake valve, port 33 registers with straight air port 24, so that any fluid in the straight air pipe 8, or possible leakage around the small piston head 38 to said pipe will not act on the under side of the rotary valve 21 and tend to lift the same from its seat.

The brakes are released after an emergency application by turning the brake valve handle to release position, and as there is a small equalizing port 49 through the piston 11, fluid under pressure will equalize from valve chamber 12 to piston chamber 10 and since the outer side of the small piston 38 is now connected through the straight air pipe 8 and ports in the rotary valve with the atmosphere, it will be seen that a differential pressure is exerted on the outer face of piston 11 which operates to shift the emergency valve parts to release position.

The emergency valve device may also be operated by means of the so-called dead man's valve which comprises a valve 41 associated with the electric car controller 42 so that when the motorman removes his hand from the controller handle, the valve 41 is automatically opened and fluid is vented from pipe 43 and passage 44. The passage 44 leads to one side of a valve piston 45 and the opposite side of the valve piston is connected by a passage 46 with passage 14 leading to piston chamber 10. When fluid is vented from the outer face of the valve piston 45, the piston chamber pressure acting on the opposite side thereof, operates to shift the valve piston to its outer position, as shown in Fig. 2 of the drawing, in which passage 46 is connected to a passage 47 open to exhaust port 48. Fluid under pressure is thus vented from piston chamber 10 and an emergency application of the brakes is effected in the same manner as hereinbefore described with the brake valve in emergency application position.

It will now be evident that with the apparatus described, a single operator, such as the motorman has full control of the doors and steps and may open or close the same as desired either when the brakes are applied or when they are released, and upon an emergency application of the brakes, the emergency valve device automatically effects the opening of the doors and steps, so that passengers may readily get out of the car if necessary.

In some instances, only the car door or doors may be controlled and in other cases both the doors and steps are pneumatically controlled, and since it is not essential to the invention as to which arrangement may be employed, it will be understood that the simple reference to car door control in the claims is intended to apply to such car entrance and exit control as may be used.

Having now described my invention, what I claim as new and desire to secure by Letters Patent, is:—

1. The combination with a brake valve device for controlling the fluid pressure operated brakes on a car, of means associated with the brake valve device for controlling fluid pressure for operating the car doors where the opening and closing of the doors is effected by fluid pressure.

2. The combination with a brake valve device for controlling the application and release of the fluid pressure brakes on a car, of means governed by said brake valve device for controlling the fluid pressure for operating a mechanism adapted to effect the opening and closing of the car doors when the brakes are applied and when the brakes are released.

3. The combination with a brake valve device for controlling the application and the release of the fluid pressure brakes on a car, of means for controlling a car door operating mechanism including ports in the brake valve device adapted in one position of the brake valve device with the brakes applied to effect the operation of the car door operating mechanism to open the doors and in another position, with the brakes applied to effect the operation of the car door operating mechanism to close the doors.

4. In a fluid pressure brake, the combination with a valve device for applying and releasing the fluid pressure brakes on a car and a brake valve for controlling said valve device, of means associated with said valve device for pneumatically controlling a car door operating mechanism and ports in said brake valve for supplying and releasing fluid under pressure to and from said car door operating mechanism, said brake valve being provided with positions for effecting the operation of said car door operating mechanism to open and to close the car doors both when the brakes are released and when the brakes are applied.

5. In a fluid pressure brake, the combination with an emergency valve device operating upon a sudden reduction in fluid pressure for effecting an emergency application of the brakes, of means associated with said emergency valve device for controlling a car door operating mechanism and operative upon movement of the emergency valve device to emergency position for effecting the operation of the car door operating mechanism, to thereby open said doors.

6. In a fluid pressure brake, the combination with an emergency valve device operating upon a sudden reduction in fluid pressure for effecting an emergency application of the brakes and a brake valve having means for controlling the brakes, of means associated with said emergency valve device for pneumatically controlling a car door operating mechanism, and ports controlled by said brake valve for also controlling the fluid pressure for operating said car door operating mechanism.

7. In a fluid pressure brake, the combination with an emergency valve device operating upon a sudden reduction in fluid pressure for effecting an emergency application of the brakes and a brake valve having means for controlling the brakes, of means associated with said valve device for pneumatically controlling a car door operating mechanism, ports in the brake valve for also supplying fluid to said car door operating mechanism, and a double check valve device for controlling communication from the brake valve and said emergency valve device to the car door operating mechanism and adapted to close one communication when fluid under pressure is supplied through the other communication.

In testimony whereof I have hereunto set my hand.

WALTER V. TURNER.

Witnesses:
A. M. CLEMENTS,
B. A. OLIVER.